United States Patent
Wen et al.

(10) Patent No.: US 10,306,720 B1
(45) Date of Patent: May 28, 2019

(54) DRIVER CIRCUIT FOR LED LIGHT

(71) Applicant: Inter-Global, Inc., St. Louis, MO (US)

(72) Inventors: Jie Wen, San Jose, CA (US); Dan Zhang, Elmsford, NY (US)

(73) Assignee: Inter-Global, Inc., St. Louis, MO (US)

( * ) Notice: Subject to any disclaimer, the term of this patent is extended or adjusted under 35 U.S.C. 154(b) by 0 days.

(21) Appl. No.: 16/161,884

(22) Filed: Oct. 16, 2018

Related U.S. Application Data (63) Continuation-in-part of application No. 14/191,572, filed on Feb. 27, 2014, now Pat. No. 10,111,286.

(51) Int. Cl.
  *H05B 37/00* (2006.01)
  *H05B 39/00* (2006.01)
  *H05B 41/00* (2006.01)
  *H05B 33/08* (2006.01)

(52) U.S. Cl.
  CPC ....... *H05B 33/083* (2013.01); *H05B 33/0815* (2013.01); *H05B 33/0887* (2013.01)

(58) Field of Classification Search
  None
  See application file for complete search history.

(56) References Cited

U.S. PATENT DOCUMENTS

| | | | |
|---|---|---|---|
| 9,000,678 B2 | 4/2015 | Huynh | |
| 9,717,120 B2 | 7/2017 | Hui | |
| 2013/0257298 A1* | 10/2013 | Cheon | H05B 37/02 315/185 R |
| 2018/0042075 A1* | 2/2018 | Welten | H05B 33/0815 |

* cited by examiner

*Primary Examiner* — Anh Q Tran
(74) *Attorney, Agent, or Firm* — Creativenture Law, LLC; Dennis JM Donahue, III; Kevin C. Staed (57) ABSTRACT

A circuit for driving an LED lighting device from an AC power source includes a rectifier and one or more strings of LEDs. Each string of LEDs includes multiple LEDs. A controller produces control signals that open and close a set of switches that corresponding with the LED groups. The controller uses a current mirror with a pair of reference branches situated between a reference voltage and ground and between the switches and ground. Each reference branch has a first-in-line resistor between the reference voltage and the current mirror which primarily set the reference current through the controller by having the highest impedances, and the control signals are produced by a set of resistors on one of the branches. Each branch also has a last-in-line resistor between the current mirror and ground with the lowest impedances. The selection of the highest impedances and lowest impedances reduces sensitivity to temperature variations.

20 Claims, 3 Drawing Sheets

DRIVER CIRCUIT FOR LED LIGHT

CROSS-REFERENCE TO RELATED APPLICATIONS

This application is a continuation-in-part of U.S. patent application Ser. No. 14/191,572 filed on Feb. 27, 2014 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

This invention relates to LED lighting and more particularly to a circuit for driving an LED light board.

Related Art

Light emitting diodes (LEDs) are solid state devices that convert electric energy to light, and generally include one or more active layers of semiconductor material sandwiched between oppositely doped layers. When bias is applied across doped layers, holes and electrons are injected into one or more active layers where they recombine to generate light that is emitted from the device.

Residential and commercial lighting are increasingly utilizing LED lighting in place of incandescent and fluorescent lighting. In a common arrangement, LED light boards are made with connections (bases) that can be used as a direct replacement for an incandescent bulb. LED boards also require driver circuitry to operate the board. In cases where an LED board is intended as a direct replacement for an incandescent bulb, the LED board must include the driver circuitry as part of the board because such circuitry is not already associated with the fixture.

Conventional AC direct drive LEDs use a fixed length LED string driven by a constant current regulator (CCR). The CCR is an electronic circuit that regulates the current running through it independent of the voltage applied. This arrangement operates by rectifying an AC input. After the AC input is rectified, the resulting DC output is a half pulse sinusoidal voltage curve at 120 Hz. Within each cycle, the LEDs will turn on when the input voltage reaches the turn on voltage of the LED string and work at full load within a very short time until the voltage drops below the turn on voltage e of the LED string. The transient time of this circuit is relatively small and can be neglected.

The CCR will begin to limit output current when the working current of the LED string reaches the anticipated current level. While the given circuit input current remains the same from this time point on, the power consumption of the LED string is a constant represented by the formula:

$$P_{LED} = V_{forward} \times I_{regulate} \quad (a)$$

The input voltage will vary over the whole cycle which means the input power is:

$$P_{input} = V_{line} \times I_{regulate} \quad (b)$$

Figure 1:
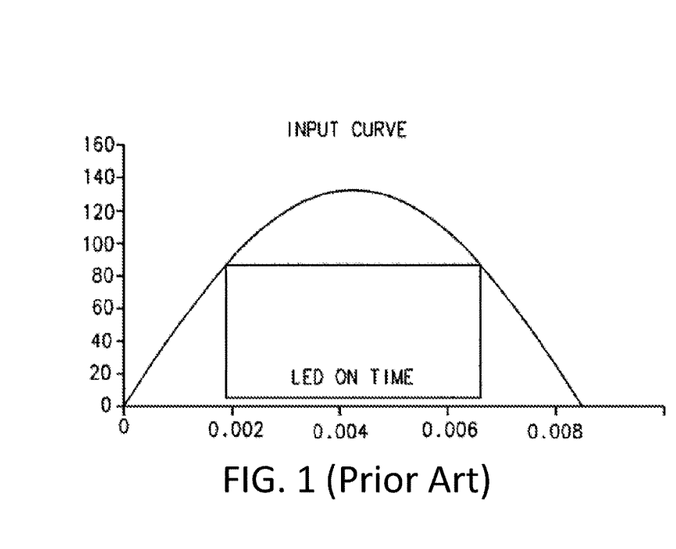
FIG. 1 is a diagram of input voltage and current provided by prior art LED board driver circuits.

Subtracting (1) from (2) yields the power dissipated by the CCR. The relative power used to illuminate the LEDs and power lost in the CCR are displayed graphically in FIG. 1. With respect to the single 120 Hz half-input wave shown, the horizontal scale of the rectangular box illustrates the time period the LED is illuminated during that half-wave input and its area represents the power used to illuminate the LED. The areas under the curve, but outside the rectangular box represents the power that is wasted in the driver circuitry.

The optimization of the efficiency in the conventional circuit is a tradeoff between the light output duty cycle and the wasted power consumed by the CCR. That is, as LEDs with higher or lower turn-on voltages are selected, different on times for the LED can be obtained, but the amount of power is wasted in the driver circuit is also affected.

It would be desirable to provide an LED board that utilizes more of the wasted energy in the driver circuit. This would provide a board that produces more light for a given number of LEDs or produces a given light output with fewer LEDs. It would also reduce the heat created by the board and improve board energy efficiency, which would further allow the board to utilize smaller heat sinks, or eliminate the heat sink entirely.

It would also be desirable to provide an LED circuit that provides a simple constructions and that also reduces the sensitivity of the circuit's controls to temperature fluctuations in the ambient temperatures and operating temperatures for the LED device. Prior solutions for stepwise control of multiple LED groups that are sequentially lit in each power cycle are complex and require more components that increase the cost of the LED device and render the LED device less efficient, and many of the current solutions are using temperature-sensitive components like bipolar junction transistor without considering the unexpected electrical fluctuations caused by temperature variance by the heat from the LEDs. Some solutions use a special integrated circuit to monitor and control the LED device, but there still remains a need for an efficient LED circuit that reduces the sensitivity of the LED device's controls to temperature fluctuations without the need for an integrated circuit.

SUMMARY OF THE INVENTION

A method and circuit for driving an LED lighting device from an AC power source comprises a rectifier and one or more sets of strings of LEDs. Each string of LEDs comprises a plurality of LEDs. A plurality of switches is controlled by a controller for opening and closing the switches. The controller is adapted to vary the number of strings conducting electricity by applying voltage from the rectifier to arrangements of the plurality of strings of LEDs selected based upon the present voltage of the output of the rectifier and the forward bias voltage of each of the strings of LEDs.

In one aspect of the present invention, the strings of switches are in series with each other while the switches are in parallel connection between the switches and the controller, and in this configuration, the controller uses a reference voltage in electrical connection with the rectifier and a current mirror situated between the reference voltage and the ground to produce control signals for the switches. The controller preferably includes a first reference branch extending from the reference voltage through a first transistor in the current mirror to the ground and a second reference branch extending from the reference voltage through a second transistor in the current mirror to the ground. The switches are preferably field effect transistors, MOSFETs in particular, with drain, source, and gate terminals. A lead from the string of LEDs connects to the drain terminal for each corresponding MOSFET. The source terminal for each one of the MOSFETs is in electrical connection with the controller through a power lead that is connected to the first reference branch at a junction between the first transistor in the current mirror and the ground, and the gate terminal for each one of the MOSFETS is in electrical connection with the controller through a control lead that is connected to the second reference branch at a set of junctions between the reference voltage and the second transistor in the current mirror. The number of junctions corresponds with the number of strings of LEDs so that each set of strings has a respective control lead and junction in the controller.

In another aspect of the invention, the controller also has a first set of resistors in the first reference branch and a second set of resistors in the second reference branch which improves the thermal stability of the control signals produced by the circuit, i.e., reduces the sensitivity to temperature variations in ambient and operating temperatures. One of the resistors in the first set of resistors is situated between the first junction and the ground and an additional resistor in the first set of resistors is situated between the reference voltage and the first transistor in the current mirror. One of the resistors in the second set of resistors is situated between the second transistor in the current mirror and the ground, and additional resistors in the second set of resistors are situated between the reference voltage and each one of the junctions for the corresponding strings of LEDs.

The aspects of the present invention as summarized above can be used together or may be used apart from each other in various LED circuits. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

While this invention is susceptible of embodiment m many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention relates to circuit for driving LED light boards. The circuit may be located within the replacement unit, such as when the board is intended as a direct replacement in a light fixture for an incandescent light bulb, or the circuit may be located within a light fixture specifically intended for use within a light fixture that allows replacement of the LEDs without requiring replacement of the driver circuit. The new circuit will drive a long LED string with multiple taps. When the line voltage changes, different taps will be switched on and off so the power dissipation on the CCR is maintained at a relatively low level and so the LED light output duty cycle is large.

Figure 2:
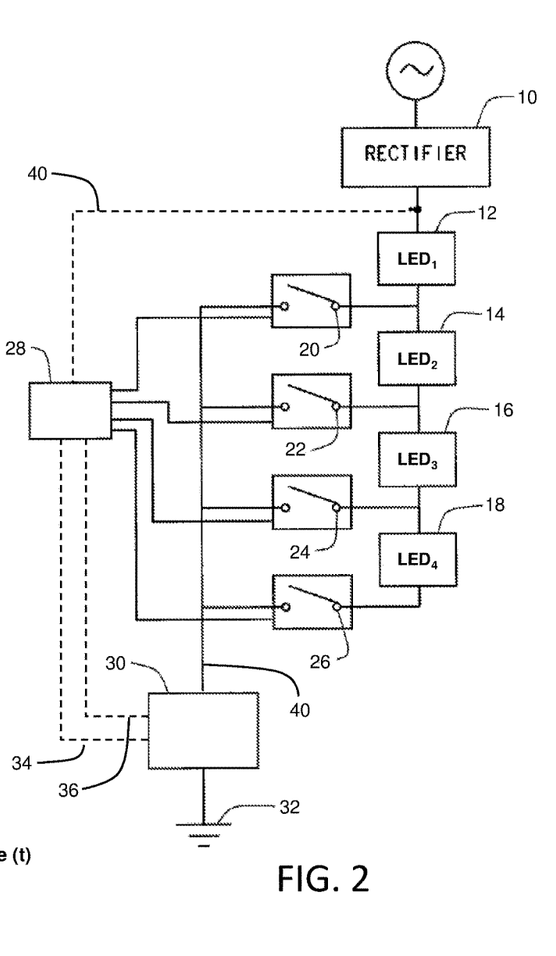
FIG. 2 is a diagram of an LED driver circuit according to an embodiment of the present invention.

Referring to FIG. 2, a preferred embodiment of the present invention is an LED driver circuit provided with an AC power source, such as that present in a typical residential or commercial power supply used for lighting, more typically an AC source at about 110-240 $V_{AC}$ operating at 50-60 Hz. A rectifier 10 rectifies the voltage and current to DC voltage and current. The DC voltage and current is then provided through a first LED string 12 and to ground when switch 20 is closed by a control 28 so that the LEDs of the first LED string 12, i.e., LED Group 1, begin to conduct and produce light. Switches 22, 24, and 26 remain open.

As the voltage increases during the first half wave of the half-wave sinusoidal input and after the bias voltage of LED string 12 is met, the voltage from the rectifier increases to a voltage that meets the bias voltage of LED string 12 and LED string 14 when connected in series. At that voltage, the control 28 opens switch 20 and closes switch 22, and the LEDs of LED string 14, i.e., LED Group 2, begin to conduct and produce light with the first lit LED string 12.

When the voltage further increases during the first half wave of the half-wave sinusoidal input and when the voltage of the rectifier 10 reaches the bias voltage of LED strings 12, 14 and 16, the control 28 closes switch 24 and opens switch 22 to allow the current to flow through the current strings of LEDs 12, 14, and 16. The LEDs of LED string 16, i.e., LED Group 3, begin to conduct and produce light with the first two (2) lit LED strings 12, 14.

Next and finally, when the voltage of the rectifier further increases during the first half wave of the half-wave sinusoidal input and reaches the bias voltage of LED strings 12, 14, 16 and 18 when connected in series, the control 28 closes switch 26 and opens switch 24 to allow the current to flow through the four strings of LEDs 12, 14, 16 and 18. The LEDs of LED string 18, i.e., LED Group 4, begin to conduct and produce light with the first three (3) lit LED strings 12, 14, 16.

As the voltage from the rectifier begins to fall on the decreasing portion of the first half wave of the half-wave sinusoidal input, the control 28 causes switch 26 to open and switch 24 to close as the voltage falls below the bias voltage of all four strings of LEDs 12, 14, 16 and 18. Likewise, as the voltage of the rectifier 10 falls below the bias voltage of LED string 12, 14, and 16, the switch 22 closes and the switch 24 opens. As the voltage of the rectifier 10 further falls below the bias voltage of LED strings 12 and 14, the control 28 closes switch 20 and opens switch 22.

After passing through the various strings of LEDs 12, 14, 16, and 18 and corresponding switches 20, 22, 24, and 26, the current passes through a constant current device 30 and to ground 32. As particularly illustrated in FIG. 6 and described in detail below, the controller 28 may provide a reference voltage ($V_Z$) and have a series of resistors that are in electrical connection with the switches. The constant current device can be a current mirror that functions as a portion of the controller with a pair of reference branches 34, 36 electrically connected to the reference voltage taken off of a lead 40 from the rectifier 10.

As the next half wave comes from the rectifier, the above cycle restarts and continues for each successive half wave.

Figure 3:
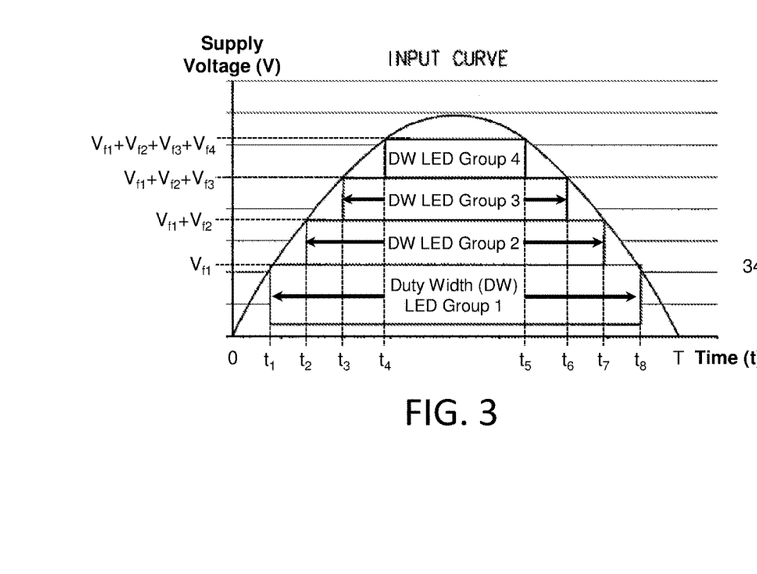
FIG. 3 is a diagram of input voltage and current of an LED driver circuit according to an embodiment of the present invention.

As can be seen from FIG. 3, the input curve supplied to the LEDs provides four (4) distinct periods of time for each half wave during which additional strings of LEDs are added and removed to the circuit to modify the LED forward bias voltage that is required from the rectifier to power at least some of the LED strings of the board. In the illustration, the horizontal axis indicates time (t), and the vertical axis indicates supply voltage (V). The duty width (DW) of each of the four (4) LED groups is shown in the chart. The effect is that much of the area under the curve from FIG. 1 that represented power wasted in the driver circuit and used in the LEDs to produce light is now utilized by the circuit to generate light in at least some of the LED strings of the board. Only a much smaller portion of the area under the curve at the leading and trailing edge of the wave and a small portion at the top of the wave, when the voltage exceeds the bias voltage of all of the LED string when connected in series, represents a much smaller amount of energy consumed by the driver circuit rather than used for creating light.

Figure 4:
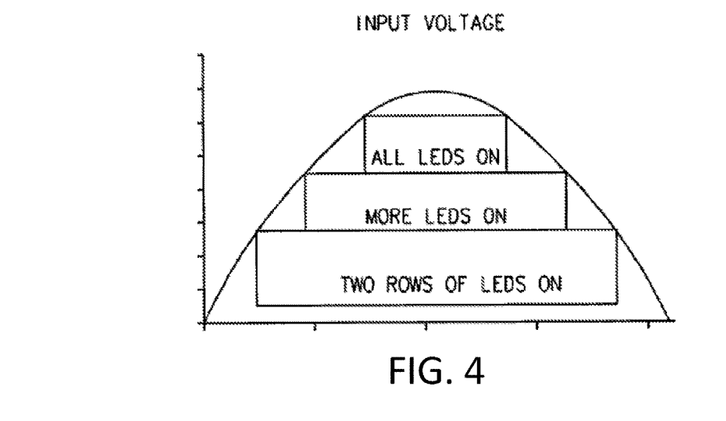
FIG. 4 is a diagram of input voltage and current of an LED driver circuit according to an embodiment of the present invention.
Figure 5:
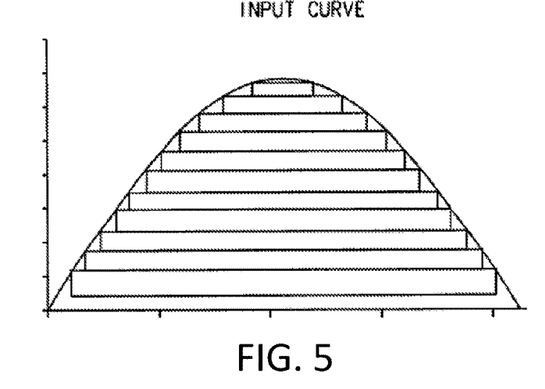
FIG. 5 is a diagram of input voltage and current of an LED driver circuit according to an embodiment of the present invention.

As seen in FIGS. 4 and 5, a fixed number of LEDs can be arranged in fewer strings of greater number of LEDs (FIG. 4) to simplify the circuit or more strings of fewer number of LEDs to increase efficiency FIG. 5). It will be appreciated that fewer LED groups would have fewer switches whereas increased LED groups would have more switches. For example, FIG. 4 represents three (3) strings of LEDs that would preferably have three (3) switches in the circuit in which each switch corresponds to one of the LED groups. Similarly, FIG. 5 represents eleven (11) LED groups that would have eleven (11) switches in the circuit. One of ordinary skill in the art, after reading this disclosure, would recognize that selecting LEDs of a particular bias voltage and selecting strings of LEDs of varying length will alter the voltages at which the switches 20-26 are opened and closed. In an example embodiment with four (4) LED groups, LEDs with about 3.1 volts of forward bias voltage are selected and arranged into first, second, third and fourth strings of LEDs of lengths of 18 LEDs, 9 LEDs, 9 LEDs, and 9 LEDs, respectively.

The rectifier 10 could include or not include output smoothing techniques, such as employing a filter capacitor, valley filling power factor correction circuit (PFC). Employing smoothing techniques may be able to reduce the voltage swings applied to the circuit from the rectifier, but may come at the cost of affecting the power factor by an impermissible amount.

Figure 6:
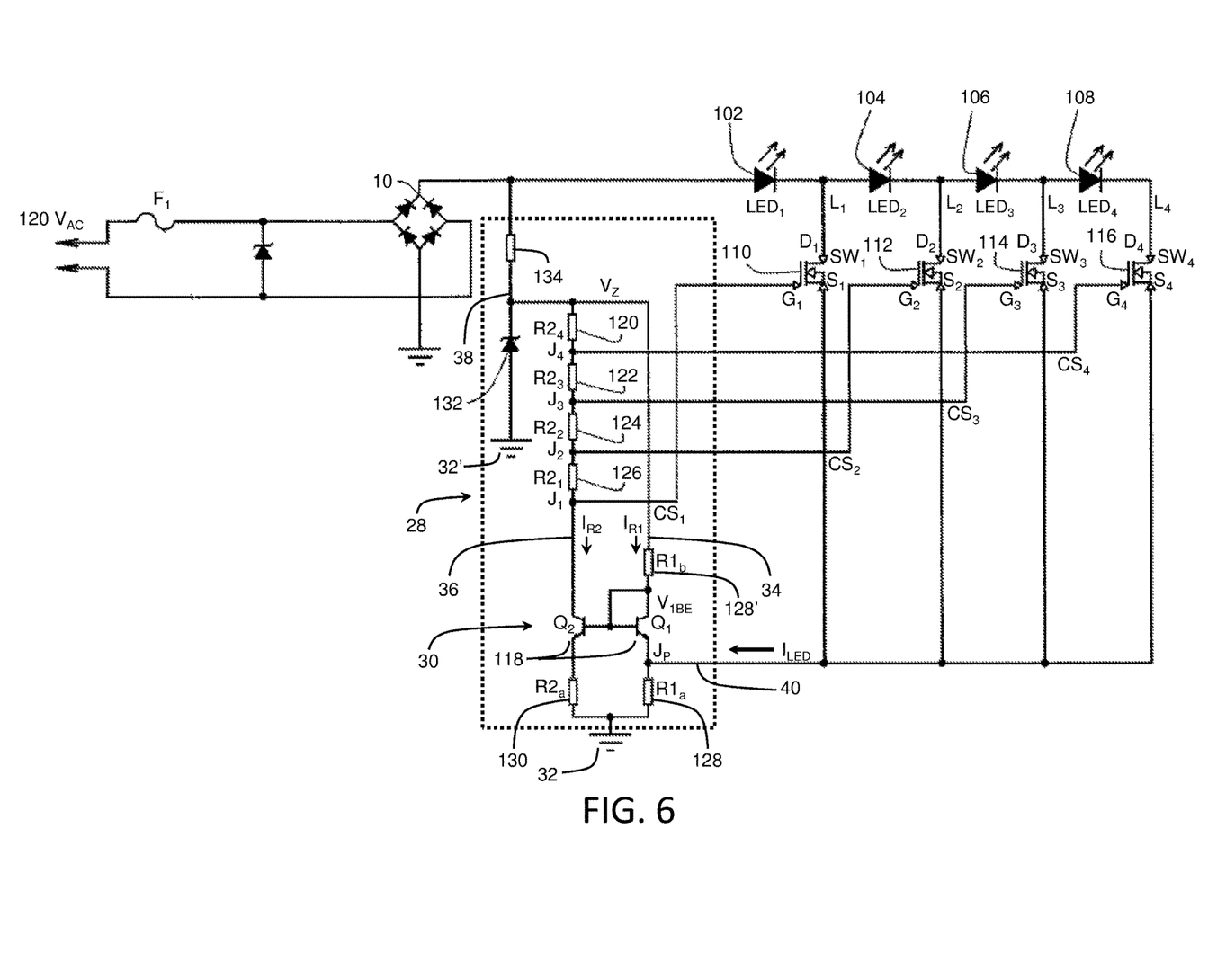
FIG. 6 is a diagram of an LED driver circuit according to an embodiment of the present invention.

Referring to FIG. 6, a particular implementation of the general circuitry of FIG. 2 is shown and described with reference to four (4) sets of LED groups. A full-wave rectifier 10 receives AC voltage ($V_{AC}$) and current and convert the AC voltage and current to a half-wave sinusoidal output. First, second, third and fourth strings of LEDs 102, 104, 106, and 108, respectively, are provided. Located after each string of LEDs are field effect transistors 110, 112, 114, and 116, preferably depletion-type MOSFETs, which act as switches. A current mirror 118 acts as a constant current device to control the amount of current that flows through the strings of LEDs 102-108. As evident from FIG. 6, the current mirror is situated between the switches and the ground 32. Resistors 120, 122, 124, 126, 128, 128', and 130 are selected to provide bias voltages that effectively open and close the switches formed by the field effect transistors 110-116. Circuit protection devices can protect the circuit from overcurrent, overvoltage and transients that would damage the circuit, such as a fuse ($F_1$) and as is known in the art.

As can be seen with reference to FIG. 6 in particular, the controller 28 can be implemented by a series of resistors 120, 122, 124, 126 in electrical connection with the corresponding switches and in combination with the current control mirror 118. Alternatively, the controller 28 could be implemented by other arrangements of discrete devices or through the use of electronic circuitry. In the circuit shown in FIG. 6, the strings of switches are in series with each other while the switches are in parallel connection between the switches and the controller. The controller also includes a Zener diode 132 and another resistor 134 in a lead 38 between the rectifier and ground 32'. A lead to the series of resistors and the current mirror is situated between the resistor and the Zener diode. Accordingly, it will be appreciated that the Zener diode sets the reference voltage ($V_Z$) 132 for the controller as it operates in electrical connection with each one of the switches and the corresponding series of LEDs.

As shown in FIG. 6, the controller preferably includes a first reference branch 34 extending from the reference voltage 132 through a first transistor ($Q_1$) in the current mirror 118 to the ground 32 and a second reference branch 36 extending from the reference voltage 132 through a second transistor ($Q_2$) in the current mirror 118 to the ground 32. The switches are preferably field effect transistors, MOSFETs in particular, with drain (D), source (S), and gate (G) terminals. Leads ($L_1$, $L_2$, $L_3$, $L_4$) from the strings of LEDs ($LED_1$, $LED_2$, $LED_3$, $LED_4$) 102, 104, 106, 108 connect to the drain terminal for each corresponding field effect transistor switch ($SW_1$, $SW_2$, $SW_3$, $SW_4$) 110, 112, 114, 116. The source terminal ($S_1$, $S_2$, $S_3$, $S_4$) for each one of the switches is in electrical connection with the controller 28 through a power lead 40 that is connected to the first reference branch 34 at a junction (JP) between the first transistor in the current mirror and the ground, and the gate terminal ($G_1$, $G_2$, $G_3$, $G_4$) for each one of the switches is in electrical connection with the controller 28 through a control lead that carries a control signal ($CS_1$, $CS_2$, $CS_3$, $CS_4$) and is connected to the second reference branch 36 at a set of junctions ($J_1$, $J_2$, $J_3$, $J_4$) between the reference voltage 132 and the second transistor ($Q_2$) in the current mirror 118. The number of junctions corresponds with the number of strings of LEDs so that each set of strings has a respective control lead and junction in the controller.

The particular selection and placement of the first set of resistors ($R1_a$, $R1_b$) 128, 128' in the first reference branch 34 and the second set of resistors ($R2_1$, $R2_2$, $R2_3$, $R2_4$, $R2_a$) 126, 124, 122, 120, 130 in the second reference branch 36 improves the thermal stability of the control signals produced by the circuit, i.e., reduces the sensitivity to temperature variations in ambient and operating temperatures. One of the resistors ($R1_a$) 128 in the first set of resistors is situated between the first junction and the ground and an additional resistor ($R1_b$) 128' in the first set of resistors is situated between the reference voltage and the first transistor in the current mirror. One of the resistors ($R2_a$) 130 in the second set of resistors is situated between the second transistor in the current mirror and the ground, and the additional resistors (R2$_1$, R2$_2$, R2$_3$, R2$_4$) 126, 124, 122, 120 in the second set of resistors are situated between the reference voltage and each one of the junctions for the corresponding strings of LEDs.

It will be appreciated that the LED current (L$_{ED}$) which flows through the power lead is significantly greater than the reference currents (I$_{R1}$, I$_{R2}$) that flow through the reference branches 34, 36. In particular, the control currents each have a current less than one hundredth of the LED current (I$_{R1}$, I$_{R2}$<I$_{LED}$/100). As shown in FIG. 6, the current of the control signals flow through the second reference branch. In each reference branch, the corresponding resistor that is first in line between the Zener diode 132 and the current mirror 118 effectively sets the reference currents. According to the embodiment shown in FIG. 6, the first in line resistor in the first reference branch is R1$_b$ 128' and the first in line resistor in the second reference branch is R2$_4$ 120. The impedances of these first in line resistors are approximately equal and are greater than the impedances of all of the other resistors in the reference branches. It will be appreciated that in a controller for a circuit that only has a single set of LEDs, the first in line resistor in the second reference branch would be R2$_1$ 126 while the first in line resistor in the first reference branch would remain R1$_b$ 128'.

The first reference branch's other resistor R1$_a$ 128 is situated between the current mirror and the ground and preferably has the lowest impedance of any resistor in the controller since it is the resistor through which the LED current flows. In reference to the other resistors in the controller, the impedance of resistor R1$_a$ 128 is significantly less than the resistor with the next higher impedance, the other resistor R2$_a$ 130 that is situated between the current mirror and the ground in the second reference branch. The impedance of resistor R2$_a$ 130 is preferably more than one hundred times the impedance of the resistor R1$_a$ 128. The impedances of the first in line resistors (R1$_b$, R2$_4$) 128' 120 are preferably more than one hundred times the impedance of the resistor R2$_a$ 130. In the particular design of the circuit shown in FIG. 6, the impedance factors are over 1,000 (i.e., R2$_a$ Ω>1,000*R1$_a$Ω; R1$_b$Ω, >1,000*R2$_a$Ω; R2$_1$Ω>1,000*R2$_a$Ω). In the second reference branch, impedance of the first in line resistor R2$_4$ 120 is more than ten (10) times the impedances of the additional resistors in the series of resistors (R2$_1$, R2$_2$, R2$_3$) 126, 124, 122 which are approximately equal to each other. Additionally, the reference voltage (V$_Z$) 132 is more than ten (10) times a base-emitter voltage (V$_{1BE}$) of the first transistor in the current mirror.

In accordance with standard practice for the use of symbols in electrical circuits, the line in the MOSFET symbol between the drain and source connections represents the transistor's semi-conductive channel. The direction of the arrow pointing inward to the MOSFET indicates that the conductive channel is preferably an N-type semiconductor device as opposed to a P-type semiconductor device in which the arrow would point outward from the MOSFET. The MOSFET is preferably an enhancement-type MOSFET which is considered normally-OFF as zero drain current flows with zero gate potential rather than a depletion-type MOSFET which is considered normally-ON as drain current can flow with zero gate biasing potential. The current mirror 118 is formed of a pair of back-to-back bipolar junction transistors (BJT) that are preferably identical components.

FIG. 3 also shows the relative voltage levels and timing points for an example circuit design that uses four (4) MOSFET switches for four (4) strings of LEDs or LED groups such as shown in FIG. 6. The sum of forward voltage threshold of the LEDs in each group is V$_{f1}$, V$_{f2}$, V$_{f3}$, and V$_{f4}$.

The number of LED groups (N) could be arbitrary, and the forward voltage of each step can be different. The particular operation of the four (4) MOSFET switches as particularly described above and shown in FIG. 6 is described for the rectified voltage period (T) shown in FIG. 3.

0≤t≤t1 or t8≤t≤T, all LED are off. The supply voltage is not high enough to turn on the LEDs in the first group.

t1≤t≤t2 or t7≤t≤t8, LED group 1 is on. The switches are all on/closed, and the LED current flows through switch 1.

t2≤t≤t3 or t6≤t≤t7, LED groups 1 and 2 are on. Switch 1 is off/open while switches 2, 3, and 4 remain on/closed, and the LED current flows through switch 2.

t3≤t≤t4 or t5≤t≤t6, LED groups 1, 2, and 3 are on. Switches 1 and 2 are off/open, while switches 3 and 4 remain on/closed, and the LED current flows through switch 3.

t4≤t≤t5, LED groups 1, 2, 3, and 4 are all on. Switch 1, 2, and 3 are off/open while switch 4 remains on/closed, and current flows through switch 1.

As explained in detail below, the particular features of the LED circuit's controller 28 according the present invention reduces the sensitivity of the LED device to temperature fluctuations without the need for controls by an integrated circuit. As explained above, the controller 28 has a voltage reference source which includes a Zener diode 132 and a resistor 134. The Zener diode sets the voltage of its cathode at a fixed value V$_Z$, and this voltage reference source provides a stable DC voltage environment for the two (2) downstream reference reference branches, and the four (4) control signals (CS$_1$, CS$_2$, CS$_3$, CS$_4$) generated by the controller and sent to the corresponding switches (SW$_1$, SW$_2$, SW$_3$, SW$_4$), respectively. The function of the control signals is not only to turn on and off (close and open) the switches but to also determine the extent to which they turn on the switches, i.e. fully on or half on. The conduction extent of the switches harnesses the current flow. Accordingly, the circuit of the present invention avoids the use of the pass stage block which is required in other LED circuit designs.

The circuit is also capable of maintaining relatively stable power during operation, regardless of the changes in the ambient temperature and the LED device's operating temperatures. Maintaining stable operation power means maintaining the drive current through the LEDs (I$_{LED}$) to be constant. The power to the LEDs account for approximately 98% of the total input current that flows through the LED circuit. In order to maintain stable drive current, the current-controllable switches must receive control signals (CS$_1$, CS$_2$, CS$_3$, CS$_4$) that are highly stable even when there are variations in the ambient and operating temperatures. To reduce the sensitivity to these temperature variations, the voltage potential on the nodes among the control components on the second reference branch 36, i.e., the series of resistors R2$_1$, R2$_2$, R2$_3$, R2$_4$ and the corresponding transistor Q$_2$ in the current mirror, must stay relatively constant with temperature variation.

The following calculation and equations analyze the characteristics of the voltage potential of the control signals. Consider the first reference branch 34 which has a pair of resistors R1$_a$, R1$_b$ on opposite sides of transistor Q$_1$ in the current mirror. The reference current I$_{R1}$ of transistor Q$_1$ can be calculated according to Equation 1 below.

$$I_{R1} = \frac{V_Z - V_{1BE} - I_{LED} \cdot R1_a}{R1_b} \quad (1)$$

$I_{LED}$ is the combined current of the LED strings.
$V_{1BE}$ is the base-emitter voltage of transistor $Q_1$.
$I_{R1}$ is the reference current of the transistor $Q_1$. The base-emitter current of both transistors can be ignored.
$V_Z$ is the set voltage of the Zener diode.

As explained above, the reference currents, $I_{R1}$ and $I_{R2}$, are very small currents compared to the LED current, $I_{LED}$. The voltage drop on $R_{1a}$ is approximately $I_{LED}*R_{1a}$. $V_Z$ is much greater than $V_{1BE}$ and $I_{LED}*R_{1a}$. Although $V_{1BE}$ is temperature related, $I_{R1}$ is almost unaffected by temperature.

The voltage-current characteristics of transistor $Q_1$ is equivalent to a diode and satisfies Equation 2 below.

$$I_{R1} = I_S \cdot e^{\frac{V_{1BE}}{V_T}} \tag{2}$$

$I_S$ is the reverse bias saturation current (or scale current).
$V_T$ is the thermal voltage ($V_T = K*T/q$).

Assume the initial situation that $Q_1$ is slightly on and its collector slightly conducts current, significantly less than the LED current (less than $0.01*I_{LED}$, and no greater than 0.1 mA). $I_{R1}$ has an initial value called $I_{R1O}$ according to Equation 3 below, and $V_{1BE}$ has a related initial value called $V_{1BEO}$.

$$I_{R1O} = I_S \cdot e^{\frac{V_{1BEO}}{V_T}} \tag{3}$$

$I_{R1O}$ is a constant, such that $I_{R1O} \leq 0.1$ mA.
$V_{1BEO}$ is the base-emitter voltage at that $I_{R1O}$.
$V_{1BEO}$ is a function of temperature T (Kelvin).

Equation 2 is divided by Equation 3 according to Equation 4 below.

$$I_{R1} = I_{R1O} \cdot e^{\frac{V_{1BE}-V_{1BEO}}{V_T}} \tag{4}$$

Since $Q_1$ and $Q_2$ are identical components and have same temperature, this initial situation also applies to $Q_2$. $I_{1RO}$ and $V_{1BEO}$ are generally renamed as $I_{RO}$ and $V_{BEO}$, respectively and rewritten as Equation 5.

$$I_{R1} = I_{RO} \cdot e^{\frac{V_{1BE}-V_{BEO}}{V_T}} \tag{5}$$

Transistor $Q_2$ works in the forward-active region, if the Early effect is ignored, the reference current of $Q_2$ is provided by Equations 6 and 7 below, and Equation 6 is divided by Equation 7 according to Equation 8 below.

$$I_{R2} = I_S \cdot e^{\frac{V_{2BE}}{V_T}} \tag{6}$$

$$I_{R2O} = I_S \cdot e^{\frac{V_{2BEO}}{V_T}} \tag{7}$$

$$I_{R2} = I_{R2O} \cdot e^{\frac{V_{2BE}-V_{2BEO}}{V_T}} \tag{8}$$

Let $Q_2$ have the same initial status that $Q_1$ has, then $I_{R2O} = I_{CO}$ and $V_{2BEO} = V_{BEO}$ resulting in Equation 9.

$$I_{R2} = I_{RO} \cdot e^{\frac{V_{2BE}-V_{BEO}}{V_T}} \tag{9}$$

Since $V_T$ and $V_{BEO}$ are both functions of temperature T, the $I_{R2}$ expression in Equation (9) also contains the variable T. The following calculations will show that T has very limited effect to $I_{R2}$.

With $V_{1B}$ as the voltage potential of the connected base of $Q_1$ and $Q_2$, and with $V_{2a}$ and $V_{1a}$ as the voltage drop on $R2_a$ and $R1_a$, respectively. The voltages are calculated according to the Equations 10 and 11 below.

$$V_{1B} = V_{1BE} + V_{1a} \tag{10}$$

$$V_{2BE} = V_{1B} - V_{2a} \tag{11}$$

Equation 12 is calculated according to (10) and (11).

$$V_{2BE} - V_{BEO} = V_{1B} - V_{2a} - V_{BEO}$$

$$V_{2BE} - V_{BEO} = V_{1BE} + V_{1a} - V_{2a} - V_{BEO}$$

$$V_{2BE} - V_{BEO} = V_{1a} - V_{2a} + (V_{1BE} - V_{BEO}) \tag{12}$$

Equation 13 is calculated according to Equation 5.

$$V_{1BE} - V_{BEO} = V_T \cdot l_n\left(\frac{I_{R1}}{I_{CO}}\right) \tag{13}$$

According to the analysis of equation (1), $I_{R1}$ is a constant, and $I_{CO}$ is also defined as a constant, then $V_{1BE} - V_{BEO}$ can be described as indicated in Equation 14.

$$V_{1BE} - V_{BEO} = C \cdot V_T \tag{14}$$

$$C = l_n\left(\frac{I_{1C}}{I_{CO}}\right), \text{ where } C \text{ is a constant,}$$

Plug Equation 14 into Equation 12, and plug Equation 12 back into Equation 9 to get Equation 15.

$$I_{R2} = I_{CO} \cdot e^{\frac{V_{1a}-V_{2a}+C \cdot V_T}{V_T}} \tag{15}$$

$$= I_{CO} \cdot e^{\frac{I_{LED} \cdot R_{1a} - I_{R2} \cdot R_{2a} + C \cdot V_T}{V_T}}$$

By properly choosing the resistance of $R_{1b}$ and reference voltage $V_Z$, it is practical to set $I_{R1}$ such that $I_{LED} \cdot R_{1a} - I_{R2} \cdot R_{2a} + C \cdot V_T$ has an efficiently small absolute value. i.e. $|I_{LED} \cdot R_{1a} - I_{R2} \cdot R_{2a} + C \cdot V_T| \ll V_T$ Equation (15) is transformed into Equation 16, and $I_{R2}$ is solved according to Equation 17.

$$I_{R2} \approx I_{CO} \cdot \left(1 + \frac{I_{LED} \cdot R_{1a} - I_{R2} \cdot R_{2a} + C \cdot V_T}{V_T}\right) \tag{16}$$

$$I_{R2} = (1+C) \cdot I_{CO} \cdot \frac{V_T + \frac{I_{LED} \cdot R_{1a}}{(1+C)}}{V_T + I_{CO} \cdot R_{2a}} \tag{17}$$

The reference current, $I_{R2}$, is a function of the thermal voltage, $V_T$, but according to the circuit of the present invention, $V_T$ is found in both the numerator and denominator. The ambient and operating temperatures for the LED circuits may vary from a low temperature of −40° C. to a high temperature of 125° C. which results in a $V_T$ range approximately from 20 mV to 34 mV. It will be appreciated that by selectively choosing the values of the resistors in the reference branches of the controller, i.e., $R_{1a}$, $R1_b$, $R2_1$, $R2_2$, $R2_3$, $R2_4$, and $R2_a$, it is practical to make $$\frac{I_{LED} \cdot R_{1a}}{(1+C)}$$

and $I_{CO} \cdot R_{2a}$ greater than $V_T$, so that the variance of $V_T$ has an insignificant effect on the reference current, $I_{R2}$.

An example can be used to further explain the mechanism by which the present invention maintains stable circuit power with variations in the ambient and operating temperatures. The values listed below can be plugged into Equation 17 as shown below for a range of temperatures to show the stability of the reference current to the changes in temperatures.

$I_{R1}$=0.26 mA,

Define $I_{C0}$=0.1 mA, then $C \approx 1$, $I_{LED}$=200 mA, $R1_a$=1 ohm, $R2_a$=1200 ohm, $$I_{R2}(T) = (1+1) \cdot 0.1 \text{ mA} \cdot \frac{V_T + 100 \text{ mV}}{V_T + 120 \text{ mV}}$$

As shown in the table below, even when the circuit of the present invention is in extreme temperature environments, in the reference branch which produces the control signals, the reference current, $I_{R2}$, is insensitive to temperature variations. Therefore, the control signals ($CS_1$, $CS_2$, $CS_3$, $CS_4$) have a high tolerance to temperature variations and remain stable.

| Temperature (° C.) | $I_{R2}$ Amperage (mA) |
|---|---|
| −40 | 0.171 |
| 125 | 0.174 |

As indicated above, the controller 28 of the present invention is suitable for use with a single set of LEDs. For example, in the embodiment shown in FIG. 6, the first LED group, $LED_1$ 102 with its corresponding lead $L_1$ and switch $SW_1$ 110 would be controlled by the controller 28 with the single control signal $CS_1$ from the corresponding junction $J_1$ at the second reference branch 36 with $R2_1$ 126 being the first in line resistor in the second reference branch. The additional resistors $R2_2$ 124, $R2_3$ 122, $R2_4$ 120 and corresponding junctions $J_2$, $J_3$, $J_4$ can be added to the second reference branch of the controller to produce the step-wise control signals $CS_2$, $CS_3$, $CS_4$ for the corresponding additional sets of LED groups, $LED_2$ 104, $LED_3$ 106, and $LED_4$ 108. For the step-wise LED control circuit, the voltage level of each control signal satisfies the set of equations: $CS_2 - CS_1 = R2_1 * I_{R2}$; $CS_3 - CS_2 = R2_2 * I_{R2}$; $CS_4 - CS_3 = R2_3 * I_{R2}$; $CS_4 = R2_4 * I_{R2}$. The control signals impact the duty order and the on/off status of the switches.

Figure 7:
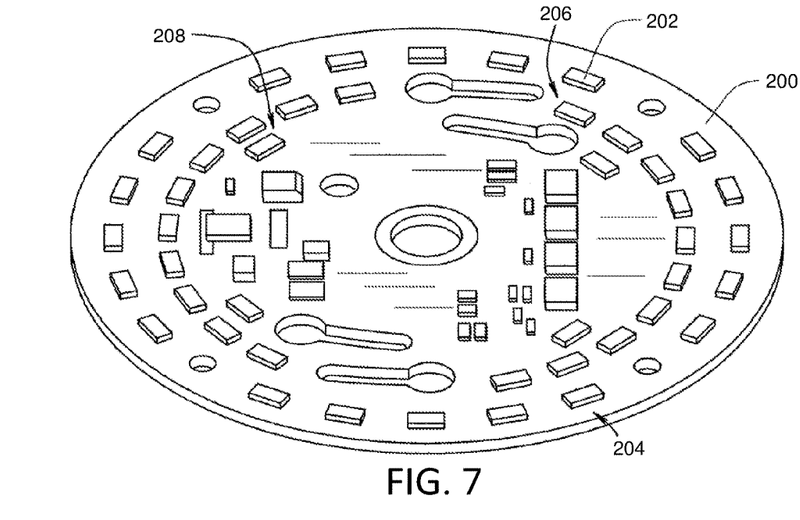
FIG. 7 is a diagram of an LED driver circuit according to an embodiment of the present invention.

Referring to FIG. 7, in a preferred physical arrangement, the LED strings are arranged on a circular circuit board 200 that will fit easily within an LED light unit. The strings are preferably arranged on the circuit board in a particular physical configuration. A first string of LEDs 202 that remain on for the greatest period of time are evenly distributed along an outer ring 204 of the circular PCB substrate. Other LEDs not in the outer ring 204 of LEDs are evenly distributed along inner rings 206, 208 of the circular board which makes the light output of the whole board as even as possible at different control phases. This arrangement also benefits the board in a way that standard dimmer switches can be used with it directly.

The above examples show that the invention, as defined by the claims, has far ranging application and should not be limited to the embodiments shown and described herein. Instead, the invention is defined by the explicit words of the claims, and the claims should not be limited to only the embodiments shown in the specification. The embodiments were chosen and described to best explain the principles of the invention and its practical application to persons who are skilled in the art. Various modifications could be made to the exemplary embodiments without departing from the scope of the invention, and it is intended that all matter contained herein shall be interpreted as illustrative rather than limiting. For example, as indicated above, the inventive controller 28 of the present invention can be used in an LED circuit that has a single set of LEDs; accordingly, persons of ordinary skill in the art would appreciate that in addition to being useful in a step-wise LED circuit with multiple sets of LEDs, the present invention can also be beneficial to a low-flicker LED circuit which has a single set of LEDs. Thus, the breadth and scope of the present invention is not limited by the above-described embodiments but is defined in accordance with the following claims appended hereto and their equivalents.

What is claimed is:

1. A circuit for driving an LED lighting device from an AC power source, comprising:
   a rectifier;
   a ground;
   a first string of LEDs in electrical connection between the rectifier and the ground, wherein the first string of LEDs comprises a plurality of LEDs and a first lead;
   a first switch comprised of a first terminal, a second terminal, and a third terminal, wherein the first terminal of the switch is electrically connected to the first string of LEDs through the first lead;
   a first set of leads extending from the first switch, wherein the first set of leads is comprised of a second lead extending from the second terminal of the first switch and a third lead extending from the third terminal of the first switch; and
   a controller for opening and closing the switch and for controlling the current through the string of LEDs, wherein the controller comprises a reference voltage in electrical connection with the rectifier, a current mirror situated between the reference voltage and the ground, a first reference branch extending from the reference voltage through a first transistor in the current mirror to the ground, and a second reference branch extending from the reference voltage through a second transistor in the current mirror to the ground, wherein the second terminal of the switch is in electrical connection with the controller through the second lead connected to the first reference branch at a first junction between the first transistor in the current mirror and the ground, and wherein the third terminal of the switch is in electrical connection with the controller through the third lead connected to the second reference branch at a second junction between the reference voltage and the second transistor in the current mirror.

2. The circuit of claim 1, further comprising a first set of resistors in the first reference branch and a second set of resistors in the second reference branch, wherein a first one of the resistors in the first set of resistors is situated between the first junction and the ground, wherein an additional resistor in the first set of resistors is situated between the reference voltage and the first transistor in the current mirror, wherein a first one of the resistors in the second set of resistors is situated between the second transistor in the current mirror and the ground, and wherein a first additional resistor in the second set of resistors is situated between the reference voltage and the second junction.

3. The circuit of claim 2, wherein the reference voltage is further comprised of Zener diode and a resistor situated between the rectifier and the Zener diode, wherein the first control brand and the second reference branch have an electrical connection to the reference voltage at an additional junction between the Zener diode and the resistor, wherein the switch is further comprised of a MOSFET with the first terminal being a drain terminal, the second terminal being a source terminal, and the third terminal being a gate terminal, wherein the second lead is a power lead through which LED current flows, wherein the third lead is a control lead through which a control signal flows, and wherein the control signal has a current less than one hundredth of the LED current.

4. The circuit of claim 2, wherein the impedance of the first one of the resistors in the second set of resistors is more than one hundred times the impedance of the first one of the resistors in the first set of resistors, and wherein the impedance of the first additional resistor in the first set of resistors is more than one hundred times the impedance of the first one of the resistors in the second set of resistors.

5. The circuit of claim 2, wherein the reference voltage is more than ten times a base-emitter voltage of the first transistor in the current mirror.

6. The circuit of claim 2, further comprising a second string of LEDs, a second switch, a second set of leads, a third junction, and a second additional resister in the second set of resistors, wherein the second string of LEDs is in serial electrical connection between the first string of LEDs and the ground, wherein the first switch and the second switch are each comprised of a MOSFET having the first terminal, the second terminal, and the third terminal, wherein the second set of leads is comprised of a fourth lead connecting the second terminal of the second switch to the first reference branch at the first junction and a fifth lead connecting third terminal of the second switch to the second reference branch at the third junction, and wherein the second additional resistor and the third junction are situated between the reference voltage and the first additional resistor.

7. The circuit of claim 6, further comprising a third string of LEDs, a third switch, a third set of leads, a fourth junction, and a third additional resister in the second set of resistors, wherein the third string of LEDs is in serial electrical connection between the second string of LEDs and the ground, wherein the third switch is comprised of a MOSFET with the first terminal, the second terminal, and the third terminal, wherein the third set of leads is comprised of a sixth lead connecting the second terminal of the third switch to the first reference branch at the first junction and a seventh lead connecting third terminal of the third switch to the second reference branch at the fourth junction, and wherein the third additional resistor and the fourth junction are situated between the reference voltage and the second additional resistor.

8. The circuit of claim 7, further comprising a last string of LEDs, a last switch, a last set of leads, a last junction, and a last additional resister in the second set of resistors, wherein the last string of LEDs is in serial electrical connection between a second to last string of LEDs and the ground, wherein the last switch is comprised of a MOSFET with the first terminal, the second terminal, and the third terminal, wherein the last set of leads is comprised of a second-to-last lead connecting the second terminal of the last switch to the first reference branch at the first junction and a last lead connecting third terminal of the last switch to the second reference branch at the last junction, and wherein the last additional resistor and the last junction are situated between the reference voltage and the second-to-last additional resistor.

9. The circuit of claim 8, wherein the last additional resistor in the second set of resistors has an impedance approximately equal to the additional resistor in the first set of resistors.

10. The circuit of claim 9, wherein the last additional resistor in the second set of resistors has an impedance approximately ten times the impedance of each of the first additional resistor, the second additional resistor, and the third additional resistor in the second set of resistors.

11. A circuit for driving an LED lighting device from an AC power source, comprising:
   a rectifier;
   a ground;
   a first string of LEDs in electrical connection between the rectifier and the ground, wherein the first string of LEDs comprises a plurality of LEDs and a first lead;
   a first switch comprised of a first terminal, a second terminal, and a third terminal, wherein the first terminal of the switch is electrically connected to the first string of LEDs through the first lead;
   a reference voltage in electrical connection with the rectifier;
   a current mirror situated between the reference voltage and the ground and between third terminal of the first switch and the ground, wherein the current mirror has a first transistor in electrical connection with a second transistor;
   a first reference branch extending from the reference voltage through the first transistor in the current mirror to the ground, wherein the first reference branch is comprised of a first junction between the first transistor and the ground;
   a second reference branch extending from the reference voltage through the second transistor in the current mirror to the ground, wherein the second reference branch is comprised of a second junction between the reference voltage and the second transistor;
   a second lead extending from the second terminal of the first switch and connected to the first reference branch at the first junction; and
   a third lead extending from the third terminal of the first switch and connected to the second reference branch at the second junction.

12. The circuit of claim 11, further comprising a first set of resistors in the first reference branch and a second set of resistors in the second reference branch, wherein a first one of the resistors in the first set of resistors is situated between the first junction and the ground, wherein an additional resistor in the first set of resistors is situated between the reference voltage and the first transistor in the current mirror, wherein a first one of the resistors in the second set of resistors is situated between the second transistor in the current mirror and the ground, and wherein a first additional resistor in the second set of resistors is situated between the reference voltage and the second junction.

13. The circuit of claim 12, wherein the reference voltage is further comprised of Zener diode and a resistor situated between the rectifier and the Zener diode, wherein the first control brand and the second reference branch have an electrical connection to the reference voltage at an additional junction between the Zener diode and the resistor, wherein the switch is further comprised of a MOSFET with the first terminal being a drain terminal, the second terminal being a source terminal, and the third terminal being a gate terminal, wherein the second lead is a power lead through which LED current flows, wherein the third lead is a control lead through which a control signal flows, and wherein the control signal has a current less than one hundredth of the LED current.

14. The circuit of claim 12, further comprising a set of additional string of LEDs, a set of additional switches for each set of additional string of LEDs, a set of additional leads for each set of additional string of LEDs, a set of additional junctions for each set of additional string of LEDs, and an additional set of resisters in the second set of resistors for each set of additional string of LEDs, wherein each additional string of LEDs is in serial electrical connection between the first string of LEDs and the ground, wherein the first switch and each additional switch are each comprised of a MOSFET having the first terminal, the second terminal, and the third terminal, wherein each additional set of leads is comprised of an additional second lead connecting the second terminal of the additional switch to the first reference branch at the first junction and an additional third lead connecting third terminal of the additional switch to the second reference branch at the additional junction, and wherein the additional resistor and the additional junction are situated between the reference voltage and the adjacent additional resistor that is more proximate to the second transistor in the current mirror.

15. The circuit of claim 12, wherein the reference voltage is more than ten times a base-emitter voltage of the first transistor in the current mirror.

16. A circuit for driving an LED lighting device from an AC power source, comprising:
  a rectifier;
  a ground;
  a set of LED strings in electrical connection between the rectifier and the ground, wherein each LED string is comprised of a plurality of LEDs and a first lead, wherein the set of LED strings is comprised of a number (NL) of LED strings, and wherein NL is at least one;
  a set of switches, wherein each of the switches is comprised of a MOSFET with a first terminal, a second terminal, and a third terminal, wherein the first terminal is electrically connected to a respective first lead of a corresponding LED string in the set of LED strings, and wherein a number of switches (NS) is equal to or greater than the number of LED strings (ND);
  a reference voltage in electrical connection with the rectifier;
  a current mirror situated between the reference voltage and the ground, wherein the current mirror has a first transistor in electrical connection with a second transistor;
  a first reference branch extending from the reference voltage through the first transistor in the current mirror to the ground, wherein the first reference branch is comprised of a first junction between the first transistor and the ground;
  a second reference branch extending from the reference voltage through the second transistor in the current mirror to the ground, wherein the second reference branch is comprised of a set of junctions between the reference voltage and the second transistor;
  a second set of leads, wherein each lead in the second set of leads respectively extends from the second terminal of a corresponding switch in the set of switches and is connected to the first reference branch at the first junction; and
  a third set of leads, wherein each lead in the third set of leads respectively extends from the third terminal of a corresponding switch in the set of switches and is respectively connected to the second reference branch at a corresponding one of the junctions in the set of junctions.

17. The circuit of claim 16, further comprising a first set of resistors in the first reference branch and a second set of resistors in the second reference branch, wherein a first one of the resistors in the first set of resistors is situated between the first junction and the ground, wherein an additional resistor in the first set of resistors is situated between the reference voltage and the first transistor in the current mirror, wherein a first one of the resistors in the second set of resistors is situated between the second transistor in the current mirror and the ground, and wherein each additional resistor in the second set of resistors is respectively situated between the reference voltage and a corresponding one of the junctions in the set of junctions.

18. The circuit of claim 17, wherein the reference voltage is further comprised of Zener diode and a resistor situated between the rectifier and the Zener diode, wherein the first control brand and the second reference branch have an electrical connection to the reference voltage at an additional junction between the Zener diode and the resistor, and wherein the switch is further comprised of a MOSFET with the first terminal being a drain terminal, the second terminal being a source terminal, and the third terminal being a gate terminal.

19. The circuit of claim 17, wherein the reference voltage is more than ten times a base-emitter voltage of the first transistor in the current mirror.

20. The circuit of claim 17, wherein the impedance of the first one of the resistors in the second set of resistors is more than one hundred times the impedance of the first one of the resistors in the first set of resistors.

* * * * *